(12) United States Patent
Chambliss et al.

(10) Patent No.: US 8,713,572 B2
(45) Date of Patent: Apr. 29, 2014

(54) METHODS, SYSTEMS, AND PHYSICAL COMPUTER STORAGE MEDIA FOR PROCESSING A PLURALITY OF INPUT/OUTPUT REQUEST JOBS

(75) Inventors: David D. Chambliss, Morgan Hill, CA (US); Joseph S. Hyde, II, Tucson, AZ (US); Prashant Pandey, San Jose, CA (US); William G. Sherman, Tucson, AZ (US); Rui Zhang, Guangzhou (CN)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/233,162

(22) Filed: Sep. 15, 2011

(65) Prior Publication Data
US 2013/0074087 A1    Mar. 21, 2013

(51) Int. Cl.
*G06F 9/46*    (2006.01)
(52) U.S. Cl.
USPC ......................................................... 718/103
(58) Field of Classification Search
USPC ......................................................... 718/103
See application file for complete search history.

(56) References Cited

U.S. PATENT DOCUMENTS

| | | | |
|---|---|---|---|
| 6,718,170 B1* | 4/2004 | Hughes ......................... | 455/450 |
| 7,757,013 B1 | 7/2010 | Lawson et al. | |
| 7,774,491 B2 | 8/2010 | Alvarez et al. | |
| 2004/0205752 A1* | 10/2004 | Chou et al. .................... | 718/100 |
| 2004/0225736 A1 | 11/2004 | Raphael | |
| 2005/0198682 A1* | 9/2005 | Wright ............................ | 725/96 |
| 2007/0127491 A1* | 6/2007 | Verzijp et al. .............. | 370/395.2 |
| 2007/0226332 A1* | 9/2007 | Becker-Szendy et al. .... | 709/224 |
| 2010/0254264 A1* | 10/2010 | Ford et al. ..................... | 370/235 |
| 2011/0182176 A1* | 7/2011 | Kenesi et al. ................. | 370/230 |
| 2012/0110591 A1* | 5/2012 | Ghosh et al. .................. | 718/104 |

OTHER PUBLICATIONS

Rui Zhang, David Chambliss and Prashant Pandey, William Sherman, Juan Ruiz, Yan Xu and Joseph Hyde, Effective Quality of Service Differentiation for Real-world Storage Systems, Aug. 2010, IEEE, 2010 18th Annual IEEE/ACM International Symposium on Modeling, Analysis and Simulation of Computer and Telecommunication Systems, p. 451-454.*

U.S. Appl. No. 13/172,648, filed Jun. 29, 2011, entitled "Methods, Computer Systems, and Physical Computer Storage Media for Managing Resources of a Storage Server," 27 pages.

* cited by examiner

*Primary Examiner* — Emerson Puente
*Assistant Examiner* — Charlie Sun
(74) *Attorney, Agent, or Firm* — Griffiths & Seaton PLLC

(57) ABSTRACT

Methods, systems, and physical computer-readable storage medium for processing a plurality of IO request jobs are provided. The method includes determining whether one or more request jobs are not meeting a QoS target, each job of the one or more request jobs having a corresponding priority, selecting a highest priority job from the one or more request jobs, if one or more request jobs are not meeting the QoS target, determining whether the highest priority job has a corresponding effective rate limit imposed thereon, if so, relaxing the corresponding effective rate limit, and if not, selecting one or more lower priority jobs from the one or more request jobs and tightening a corresponding effective limit on the one or more lower priority jobs from the one or more request jobs in accordance with a delay factor limit.

20 Claims, 5 Drawing Sheets

METHODS, SYSTEMS, AND PHYSICAL COMPUTER STORAGE MEDIA FOR PROCESSING A PLURALITY OF INPUT/OUTPUT REQUEST JOBS

BACKGROUND OF THE INVENTION

1. Field of the Invention

The present invention relates in general to processing input/output (IO) requests, and more particularly, to methods, systems and physical computer storage media for processing IO request jobs.

2. Description of the Related Art

Computing systems can have multiple host servers and multiple storage servers that are typically used to perform disparate job functions. Each storage server is used for multiple jobs. To determine which jobs have priority to be performed over others, a service level agreement is implemented as part of a policy of the computing system. The service level agreement provides rules for managing the system resources.

While data for each job is normally maintained separately, the same system resources, such as disk drives, buses, adapters, processors, memory, and others, may be used to perform the jobs. Because the resources have limited performance support capabilities, when multiple jobs use the same resources, each job normally achieves lower performance than it would achieve if it had exclusive use of the resource. Thus, in order to fulfill quality-of-service guarantees delineated by the service level agreement within the computing system, performance measurements may be required along various network routes throughout the system. In particular, the computer system measures resource consumption while an application is running. Measurements are taken along particular routes and metrics and descriptions relating to operations performed consuming bandwidth are accumulated.

SUMMARY OF THE INVENTION

Different applications may have different quality-of-service requirements delineated by the service level agreement. For instance, some applications may require a faster response time and/or higher input/output throughput than other applications. In other cases, an application may require larger bandwidth or larger storage capacity than another application. In other cases, even when the numerical requirements are the same, it may be more important to achieve the goals for one application than for others. In the past, lower priority input/output (IO) requests were throttled based on static rate limits. As a result, in some instances, lower priority IO requests would unnecessarily be denied good service even when the system was not overloaded. In other instances, the static rate limits would be too lax to relieve the overload in the system, and as a result, the high-priority jobs would receive poor performance. Another procedure applied throttle limits without regard to priority. As a result, in many instances the system would not take strong enough action to protect the high-priority jobs, and in other instances it would cause more harm than good. To optimize overall performance of the system, improved methods and systems for processing IO requests are needed.

In an embodiment, by way of example only, a method of processing a plurality of input/output (IO) request jobs is provided. The method includes determining whether one or more request jobs are not meeting a quality of service (QoS) target, each job of the one or more request jobs having a corresponding priority, selecting a highest priority job from the one or more request jobs, if one or more request jobs are not meeting the QoS target, determining whether the highest priority job has a corresponding effective rate limit imposed thereon, if the highest priority job has the corresponding effective rate limit imposed thereon, relaxing the corresponding effective rate limit, and if the highest priority job does not have the corresponding effective rate limit imposed thereon, selecting one or more lower priority jobs from the one or more request jobs and tightening a corresponding effective limit on the one or more lower priority jobs from the one or more request jobs in accordance with a delay factor limit.

In another embodiment, by way of example only, a system for processing a plurality of input/output (IO) request jobs is provided. The system includes a database defining a corresponding quality of service (QoS) target for each IO request job, a corresponding priority for each IO request job, and a delay factor limit for each request job and a processor in communication with the database. The processor is configured to determine whether one or more request jobs are not meeting the corresponding quality of service (QoS) target, to select a highest priority job from the plurality of request jobs, to determine whether the highest priority job has a corresponding effective rate limit imposed thereon, if one or more jobs of the plurality of request jobs are not meeting the QoS target, if the highest priority job has the corresponding effective rate limit imposed thereon, to relax the corresponding effective rate limit of the highest priority job, and if the highest priority job does not have the corresponding effective rate limit imposed thereon, to select one or more lower priority jobs from the one or more request jobs and to tighten the corresponding effective limit on the one or more lower priority jobs from the one or more request jobs in accordance with a delay factor limit.

In still another embodiment, by way of example only, a physical computer storage medium comprising a computer program product method for processing a plurality of input/output (IO) request jobs is provided. The physical computer storage medium includes computer code for determining whether one or more request jobs are not meeting a quality of service (QoS) target, each job of the one or more request jobs having a corresponding priority, computer code for selecting a highest priority job from the one or more request jobs, computer code for determining whether the highest priority job has a corresponding effective rate limit imposed thereon, if one or more request jobs are not meeting the QoS target, computer code for relaxing the corresponding effective rate limit, if the highest priority job has the corresponding effective rate limit imposed thereon, and computer code for selecting one or more lower priority jobs from the one or more request jobs and tightening a corresponding effective limit on the one or more lower priority jobs from the one or more request jobs in accordance with a delay factor limit, if the highest priority job does not have the corresponding effective rate limit imposed thereon.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide methods, systems, and physical computer-readable storage media for processing a plurality of IO request jobs. In an embodiment, the method includes determining whether one or more request jobs are not meeting a QoS target, each job of the one or more request jobs having a corresponding priority, selecting a highest priority job from the one or more request jobs, if one or more request jobs are not meeting the QoS target, determining whether the highest priority job has a corresponding effective rate limit imposed thereon, if so, relaxing the corresponding effective rate limit, and if not, selecting one or more lower priority jobs from the one or more request jobs and tightening a corresponding effective limit on the one or more lower priority jobs from the one or more request jobs in accordance with a delay factor limit. The above methods and systems improve efficiency at an IO level, resolve potential conflicts between disparate resources, and may be retrofitted into existing systems.

Figure 1:
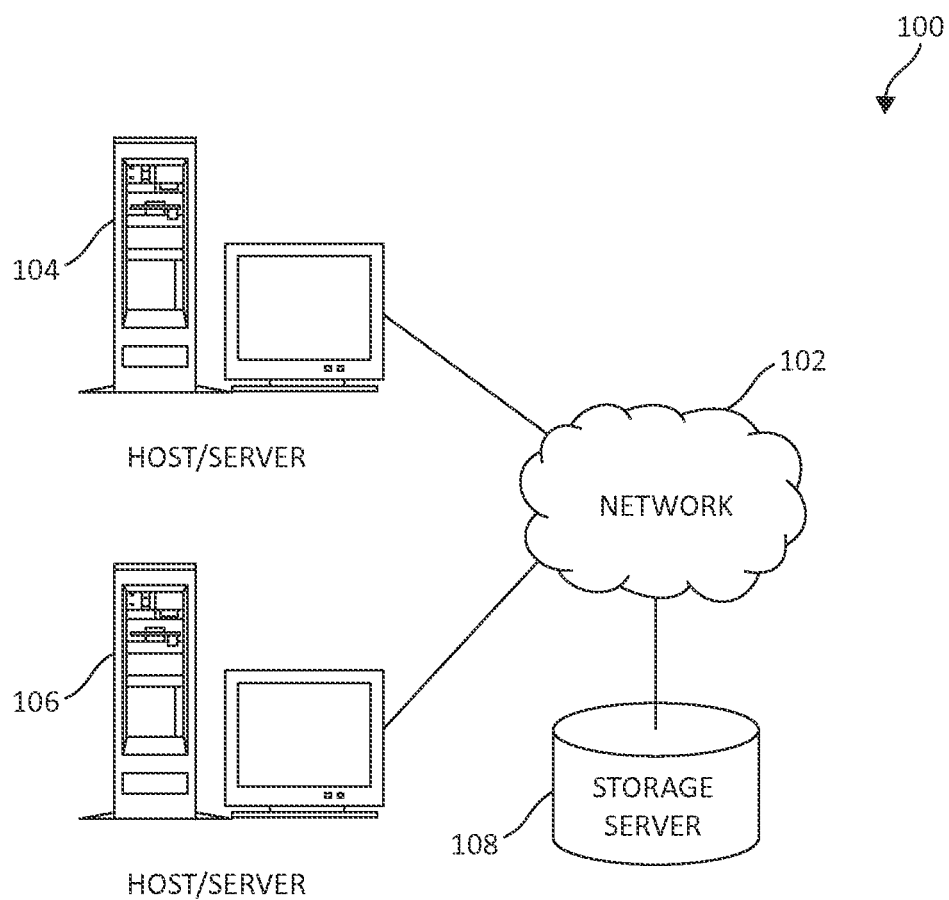
FIG. 1 is a pictorial representation of an example distributed data processing system, according to an embodiment.
Figure 2:
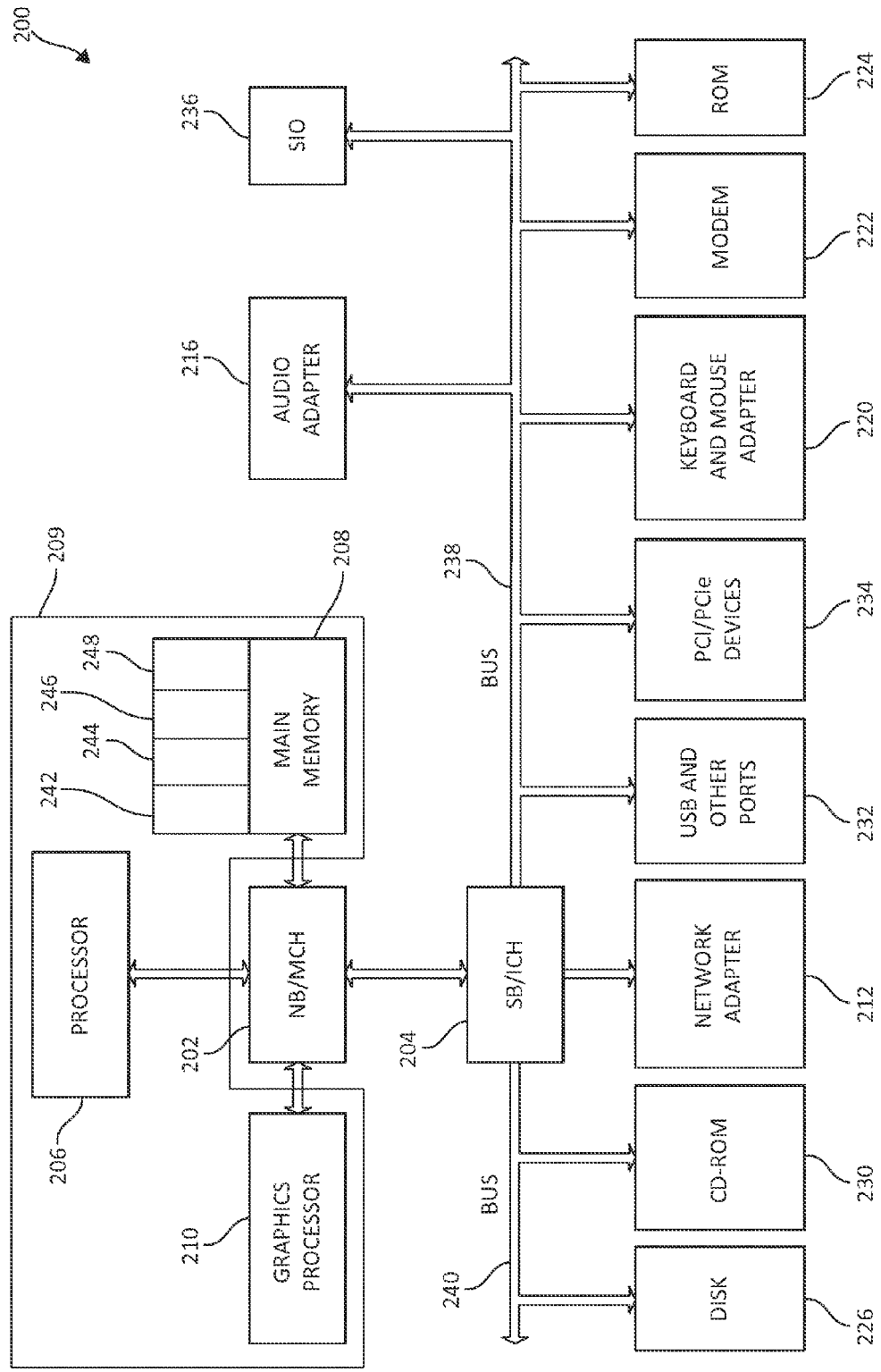
FIG. 2 is a block diagram of an example data processing system, according to an embodiment.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, host/server 104 and host/server 106 are connected to network 102 along with storage server 108. One or both of the host/servers 104, 106 are application servers and include a storage controller 109, 111 that is configured to control storage and access of data stored on the storage server 108. In this regard, the host/servers 104, 106 are configured to provide input/output ("IO") requests to the storage server 108. The IO requests are assigned to jobs (which are also referred to as request jobs or as IO request jobs). Each job is assigned a priority level. A job is a grouping of IO requests that are to be treated similarly in the operation of the invention. In an embodiment, the host/servers 104, 106 assign priority levels directly to the IO requests, and all IOs having the same priority level are assigned to the same job. For example, the priority level of an IO request can range from a high priority, a medium priority, or a low priority. Thus, one IO request can have a higher or lower priority level than another IO request. Other mechanisms for assigning jobs and priority levels can be included in other embodiments. For example, IO requests from a single host/server might be assigned to one job. For another example, IO requests against a particular logical unit, or data set, or file system, or directory might be assigned to one job. Assignment to a particular job might be done by the host/server or by the storage server.

Storage server 108 may include a storage unit and can comprise any storage system. Examples of storage server 108 may include an advanced storage device, such as a DS8000 dual node controller, or a file server, such as a network attached storage (NAS) device. Although two host/servers 104, 106 are shown, more or fewer can be included in other embodiments. Distributed data processing system 100 may include additional servers, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. The illustrative embodiments are also particularly well suited for implementation with networks, such as SANs, where the wires and switches utilize Fibre Channel, iSCSI, FCOE, or the like technologies. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as host/server 104, 106 in FIG. 1, in which computer usable code or instructions implementing the processes for illustrative embodiments of the present invention may be located.

Data processing system 200 includes a controller 209 comprising a processor 206, main memory 208 and, alternatively, a graphics processor 210. The controller 209 supplies commands to run database and/or backup applications to the system 200. In the depicted embodiment, the data processing system 200 employs a hub architecture including north bridge and memory controller hub (NB/MCH) 202 and south bridge and input/output (I/O) controller hub (SB/ICH) 204. Processor 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processor 206. The operating system coordinates and provides control of various components within the data processing system 200 in FIG. 2. As a host, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processor 206. Alternatively, a single processor system may be employed. Moreover, in one illustrative embodiment, the data processing system 200 may be comprised of one or more System p servers with a network of host adapters to communicate over the network 102 in FIG. 1, and a network of RAID adapters to communicate to a plethora of storage devices.

Computer code for the operating system, the object-oriented programming system, and applications or programs (such as backup applications or database applications) are located on storage devices, such as HDD 226, and may be loaded into main memory 208 for execution by processor 206. The processes for illustrative embodiments of the present invention may be performed by processor 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, although a distributed system is depicted, a single system alternatively can be employed. In such embodiment, some of the hardware (such as the additional server) may not be included. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including host computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
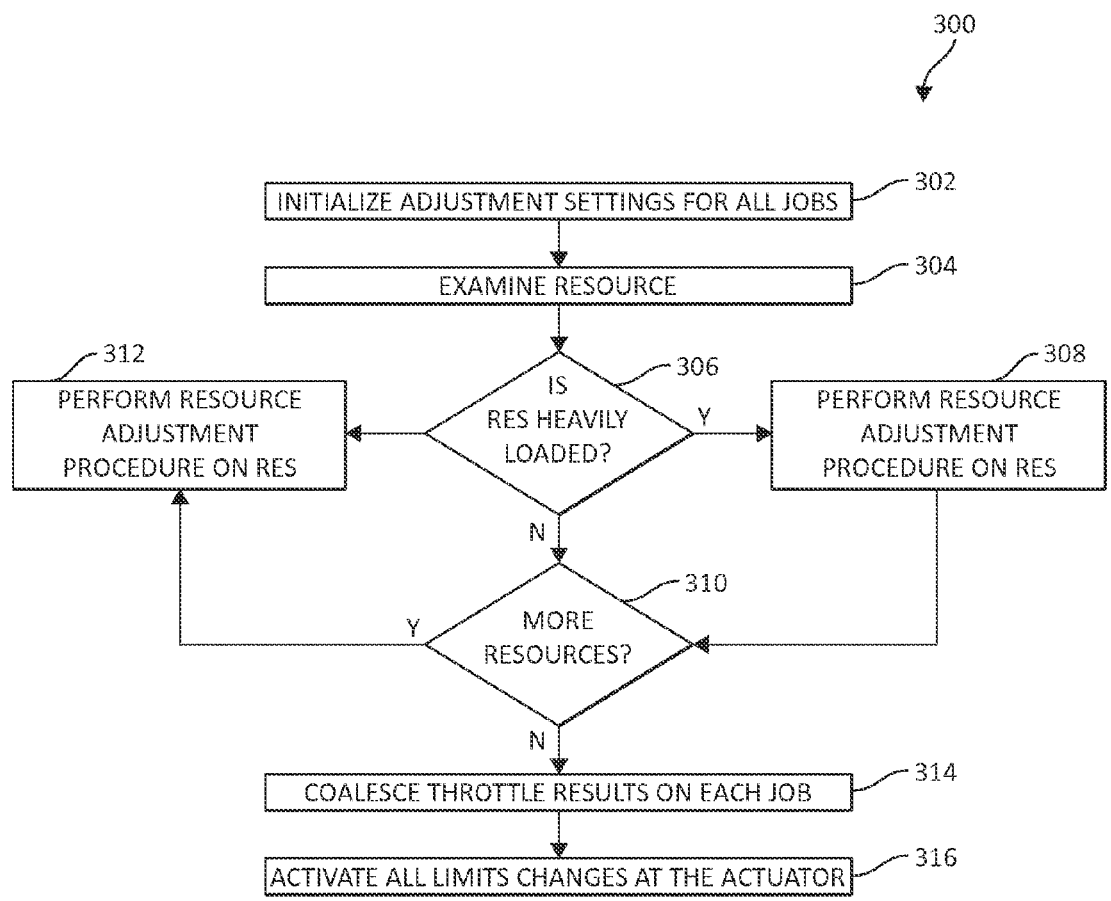
FIG. 3 is a flow diagram of a method of processing a plurality of input/output (IO) request jobs, according to an embodiment.

FIG. 3 is a flow diagram of a method 300 of processing a plurality of input/output (IO) request jobs, according to an embodiment. The method 300 adjusts resource usage according to a defined policy in order to optimize performance of all incoming IO request jobs. In this regard, step 302 in the method 300 includes initializing adjustment setting for all IO request jobs. In an embodiment, the adjustment settings are initialized by the policy, which can be supplied to the system either by a user, system administrator, or system owner or can be embedded as a default. In an embodiment, the policy defines the quality-of-service (QoS) attributes for all of the IO jobs. The core QoS attributes include QoS target, delay factor limit, and priority. The QoS target is set to define an aggressiveness of a request job in seeking a QoS preference. In one embodiment the QoS target is a ratio between the optimum combined response time for a set of IOs and the maximum acceptable value for combined response time. In another embodiment the QoS target is the maximum acceptable response time. In another embodiment the QoS target is a minimum acceptable throughput. The delay factor limit defines the generosity of a request job in submitting its own performance for the benefit of other request jobs. In one embodiment the delay factor limit is the maximum acceptable ratio between combined response time and the combined service time where the service time is computed as the difference between the response time and the delay due to rate limiting. In another embodiment the delay factor limit is the maximum acceptable delay due to rate limiting. In another embodiment the delay factor limit is the minimum allowed rate limit. The combined response time for a job is a measurement obtained by mathematically combining the response times for the IO requests in that job. The formula for combining the value could be an arithmetic mean or another averaging formula. In other embodiments, other QoS attributes are defined.

Next, a resource is examined, step 304. The resource is a resource used by the system (e.g., system _____ ) to perform the IO request jobs. For example, the resources include, but are not limited to disk drives, buses, adapters, processors, memory and any other components used by the system. A determination is made as to whether the resource is overloaded, step 306. The resource is deemed "overloaded" when adding additional load to it would cause the performance offered to its existing load to be made worse. For example, a disk drive may be deemed overloaded if newly arrived operations are typically delayed in queue while prior operations are being serviced. In an embodiment, the determination of step 306 is made by comparing the measured load on the resource with a threshold value determined as part of performance calibration.

If the resource is overloaded, a resource adjustment procedure is performed on the resource, step 308. The resource adjustment procedure, which will be explained in more detail below in conjunction with FIG. 4, generally adjusts the resources either by relaxing or tightening the rate limit on an IO request job. After the resource adjustment procedure is performed, a determination is made as to whether additional resources remain to be evaluated, 310. If at step 310 more resources are to be evaluated, the method advances to the next resource 312 and iterates at step 308.

If no additional resources are to be evaluated, the method 300 advances to step 314, where throttle results on each request job are coalesced. In particular, if any rate limits were imposed or tightened on the job by instances of the resource adjustment step 308, the most restrictive rate limits are selected and applied. As used herein, the term "rate limit" refers to a parameter used to determine the scheduling of requests, so as to control the number of measured events for a job in a predetermined amount of time. The measured events can be the number of tasks performed, the aggregated size of requests, the estimated amount of a resource that is used, or the estimated cost of performing the requests. The rate limit may be the actual maximum permitted rate of events per unit time, or it may be a scheduling delay value to be inserted so as to achieve the target rate. If no rate limits were imposed or tightened on the job, then any pre-existing limits are relaxed by the smallest relaxation values computed for the job by instances of the resource adjustment step 308. Next, the rate limit changes are activated, step 316. For example, the new values of rate limits are delivered to a rate limit actuator which applies each per-job rate limit to the scheduling of storage tasks received by a storage server. In such an embodiment, the task is admitted for processing by the storage server and permitted to consume a given quantity of resources that does not violate the rate limit imposed.

Figure 4:
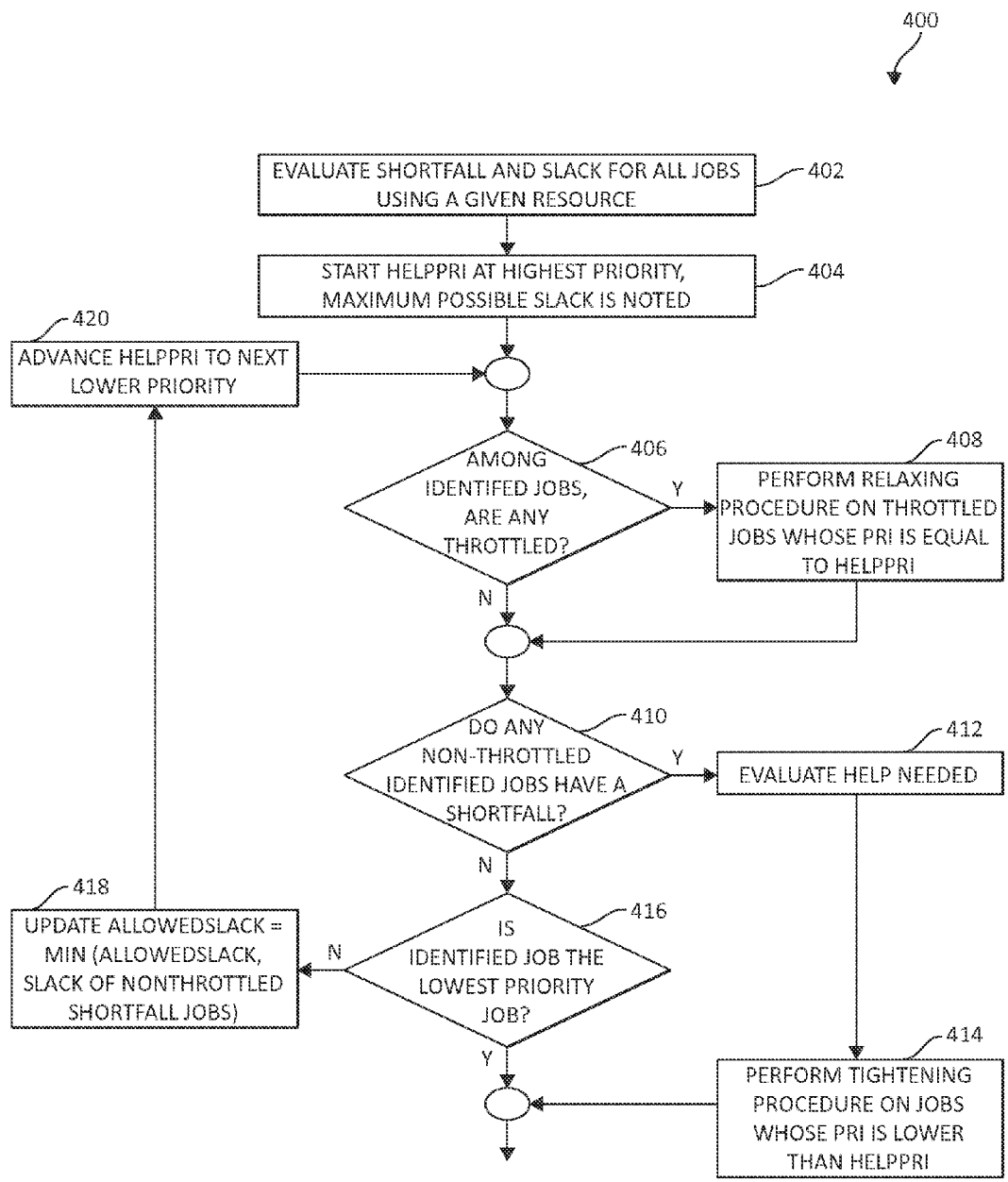
FIG. 4 is a flow diagram of a resource adjustment procedure, according to an embodiment.

FIG. 4 is a flow diagram of a resource adjustment procedure 400, according to an embodiment. The operation of the resource adjustment procedure 400 is generally to adjust the throttle rate limits of all jobs at a given priority level according to the performance state of the jobs at higher priority levels. When all jobs at higher priority levels are overachieving their QoS targets, any throttling on jobs at the next lower priority level is then relaxed, according to the amount of slack afforded by the higher-priority jobs, which expresses numerically the amount of throttle relaxation which is possible without causing a shortfall in the higher priority jobs. If however some jobs at higher priority level are not achieving their QoS targets, there is zero slack for loosening and those jobs are considered to have a shortfall. The resource adjustment procedure 400 performs this by iterating through the priority levels and performing evaluations at each level. Each iteration of the procedure references a specific priority level for which QoS help is being considered, and this value is denoted in steps of FIG. 4 as HELPPRI.

The resource adjustment procedure 400, which can be performed at step 308 of method 300 (FIG. 3), begins by evaluating a shortfall and slack for each IO request job using a given resource, step 402. Next, HELPPRI is started at the highest priority of jobs and maximum possible slack value is noted, step 404. A determination is then made as to whether any of the jobs at priority level HELPPRI are being throttled, step 406. For example, a determination is made as to whether any of the jobs at priority level HELPPRI has a corresponding effective rate limit being imposed thereon. If so, a relaxing procedure is performed on the throttled jobs at priority level HELPPRI, step 408. The relaxing step makes the rate limit less stringent, so the allowed rate for that job is increased. The amount by which the rate is increased is dependent on the amount of slack available as determined from the jobs of priority higher than HELPPRI. If step 408 is performed when HELPPRI is the highest priority then there are no jobs of higher priority, and the available slack is the value noted in step 404. In an embodiment, a corresponding allowed rate defining, in part, the corresponding effective rate limit, is increased.

Figure 5:
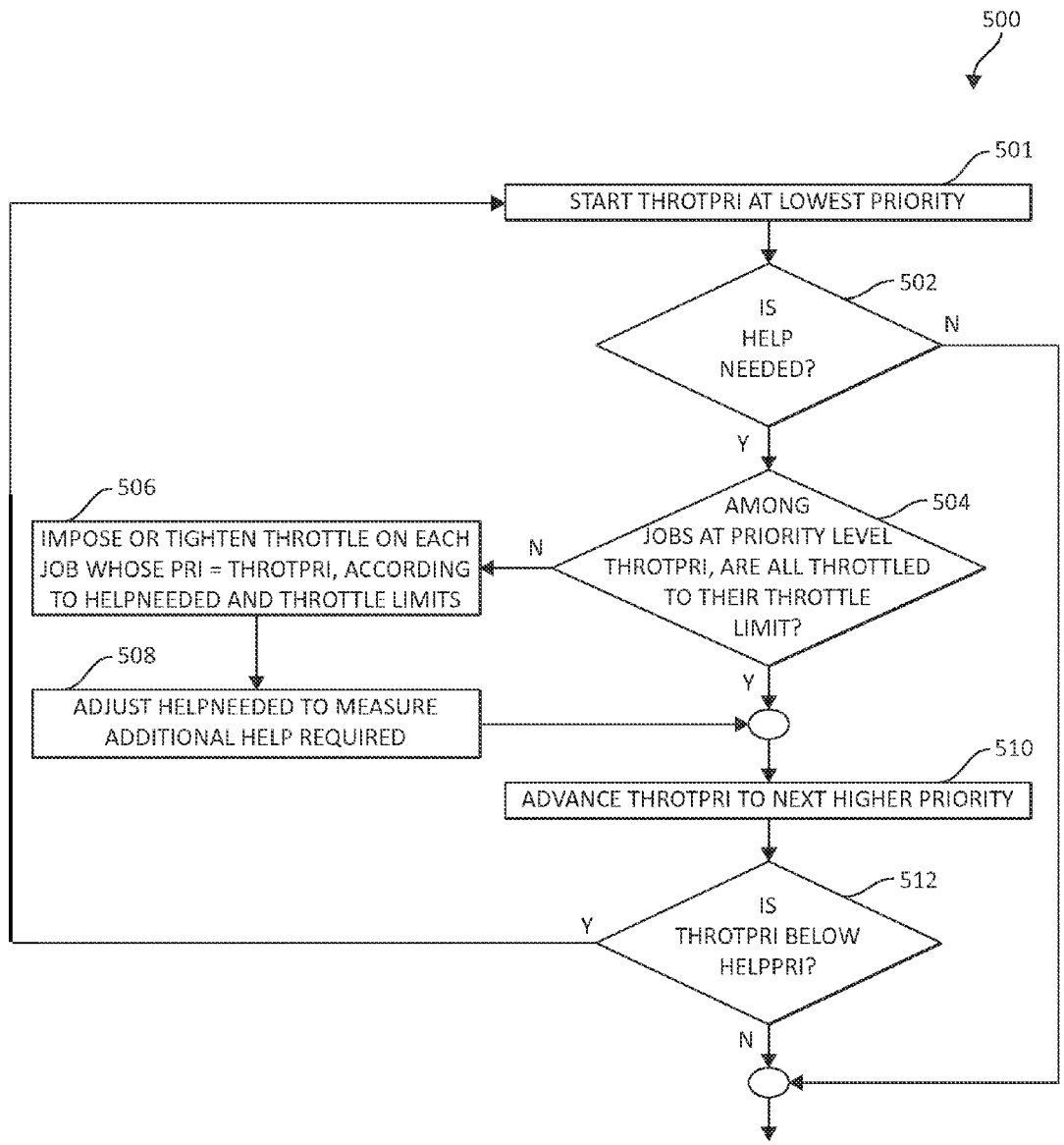
FIG. 5 is a flow diagram of a tightening procedure to be performed as part of step of the method shown in FIG. 4, according to an embodiment.

If none of the highest priority IO request jobs are being throttled, then a determination is made as to whether the highest priority IO request jobs have a shortfall, step 410. A "shortfall" as used herein, may be defined as failing to meet a QoS target, as defined by the policy. Thus, a determination is made whether one or more of the jobs at priority level HELP-PRI are not meeting the QoS target. If so, an evaluation is made as to how much help is needed to overcome the shortfall, step 412. In particular, a tightening procedure, which will be described in further detail below in conjunction with FIG. 5, is performed on the request jobs having a priority lower than priority level HELPPRI, step 414. As used herein, "tightening" may be defined as imposing a rate limit or decreasing a rate limit assigned to the IO request job.

Returning to step 410, if the jobs at priority level HELPPRI do not have a shortfall, then the method 400 continues to step 416 where a determination is made as to whether those request jobs are the lowest priority jobs to be evaluated. If the request jobs are the lowest priority jobs to be evaluated, then the method 400 ends. If the request jobs are not the lowest priority jobs to be evaluated, then the available amount of slack is updated to be the minimum amount of allowed slack among the jobs at priority level HELPPRI, step 418. Next, the method advances to the job or jobs having a priority that is lower than that that was just evaluated, step 420, and the method iterates at step 406. It will be understood that alternate embodiments may not follow the procedure of FIG. 4 in its specifics. For example, an embodiment may perform steps 410, 412, and 414 only when HELPPRI is the highest priority level. Alternatively, an embodiment might not use an iterative procedure that steps from highest priority through the lower priorities.

FIG. 5 is a flow diagram of a tightening procedure 500 to be performed as part of step 414 of method 400, according to an embodiment. The tightening procedure 500 operates with visibility to the resource being addressed in procedure of FIG. 3 in which it is performed, with visibility to the value of HELPPRI from the adjustment procedure 400 in which it is performed, and also with visibility to HELPNEEDED which is a numerical value which represents the amount of help needed as determined in step 412. According to one embodiment the value HELPNEEDED is a change in utilization for the resource being addressed, for example a number of operations per second for a disk drive or a number of megabytes per second for a data transmission link by which utilization is to be decreased. Other interpretations of HELPNEEDED are possible in embodiments of this invention.

The tightening procedure 500 is limited by the delay factor limit (e.g., tightening is imposed such that actual and proposed performance of a request job does not violate the delay factor limit set in the policy). The tightening procedure begins at THROTPRI at lowest priority, step 501. As noted in step 412 of method 400, an evaluation is made as to whether help is needed, step 502. If so, a determination is made as to whether those request jobs that have lower priority are being throttled to their throttle limit, step 504. If not, throttle is imposed or tightened on one or more of the lower priority request jobs in accordance to a throttle limit, step 506. According to an embodiment, tightening a throttle is decreasing the allowed rate for a rate limit that is already in place. Next, the value of HELPNEEDED is adjusted in step 508 according to the amount of help provided through imposing or tightening throttle limits in step 506. The adjusted value of HELPNEEDED represents the amount of additional help expected from further iterations. Then the method 500 continues to step 510 where evaluation is made on a next higher request job. If at step 504, those request jobs that have lower priority are being throttled to their throttle limit, then the method continues to step 510. After step 510, a determination is made as to whether the next higher request job has a priority that is still lower than that of the priority level HELPPRI, step 512. If so, the method reiterates at step 502. If not, the method 500 ends.

By employing the above-described tightening and relaxing procedures, the improved system can operate more efficiently than conventional systems. Specifically, by determining whether a shortfall of an IO request job exists and by tightening or relaxing rate limits on high or low priority jobs, resources for performing the IO request jobs are reallocated in a more efficient manner.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A method of processing a plurality of input/output (IO) request jobs comprising:
   determining whether one or more IO request jobs are not meeting a quality of service (QoS) target, each IO request job of the one or more IO request jobs having a corresponding priority;
   selecting a highest priority job from the one or more IO request jobs;
   if one or more IO request jobs are not meeting the QoS target, determining whether the highest priority job has a corresponding effective rate limit imposed thereon;

if the highest priority job has the corresponding effective rate limit imposed thereon, relaxing the corresponding effective rate limit; and if the highest priority job does not have the corresponding effective rate limit imposed thereon, selecting one or more lower priority jobs from the one or more IO request jobs and tightening a corresponding effective limit on the one or more lower priority jobs from the one or more IO request jobs in accordance with a delay factor limit, wherein the step of selecting one or more lower priority jobs includes:

beginning at a lowest priority job, determining whether the lowest priority job is being throttled to a throttle limit;

if the lowest priority job is not being throttled to the throttle limit, imposing the throttle limit on the lowest priority job to provide an amount of help, wherein an amount by which the corresponding effective rate limit is relaxed is based in part on the amount of help; and if the lowest priority job is being throttled to the throttle limit, advancing to a next higher priority level job.

2. The method of claim 1, wherein the step of relaxing comprises increasing a corresponding allowed rate defining, in part, the corresponding effective rate limit.

3. The method of claim 2, wherein the one or more IO request jobs includes a plurality of highest priority jobs and:
the step of selecting comprises selecting all of the highest priority jobs from the one or more IO request jobs; and
the method further comprises performing the step of relaxing after the step of selecting, if at least one of the highest priority jobs of the one or more IO request jobs has a corresponding effective rate limit imposed thereon.

4. The method of claim 1, wherein the step of selecting a highest priority job comprises tightening the corresponding effective limit on the lowest priority job of the one or more lower priority jobs.

5. The method of claim 1, wherein the step of selecting the highest priority job comprises imposing corresponding rate limits on the one or more lower priority jobs.

6. The method of claim 1, wherein the step of selecting the highest priority job comprises decreasing corresponding rate limit values assigned to the one or more lower priority jobs.

7. The method of claim 1, wherein the delay factor limit comprises a maximum permitted degradation of performance for an IO request job caused, in part, by imposition of the corresponding rate limits of the one or more IO request jobs.

8. The method of claim 1, further comprising relaxing the corresponding effective limit of the highest priority job, if the highest priority job has the corresponding effective rate limit imposed thereon and if all of the IO request jobs are meeting the QoS target.

9. A system for processing a plurality of input/output (IO) request jobs comprising:
a database defining a corresponding quality of service (QoS) target for each IO request job included in the plurality of IO request jobs, a corresponding priority for each IO request job, and a delay factor limit for each IO request job;
a processor in communication with the database, the processor configured:
to determine whether one or more IO request jobs are not meeting the corresponding quality of service (QoS) target,
to select a highest priority job from the plurality of IO request jobs,
to determine whether the highest priority job has a corresponding effective rate limit imposed thereon, if one or more IO request jobs of the plurality of IO request jobs are not meeting the QoS target,
if the highest priority job has the corresponding effective rate limit imposed thereon, to relax the corresponding effective rate limit of the highest priority job, and
if the highest priority job does not have the corresponding effective rate limit imposed thereon, to select one or more lower priority jobs from the one or more IO request jobs and to tighten the corresponding effective limit on the one or more lower priority jobs from the one or more IO request jobs in accordance with a delay factor limit,
wherein to select the one or more lower priority jobs includes:
beginning at a lowest priority job, determining whether the lowest priority job is being throttled to a throttle limit;
if the lowest priority job is not being throttled to the throttle limit, imposing the throttle limit on the lowest priority job to provide an amount of help, wherein an amount by which the corresponding effective rate limit is relaxed is based in part on the amount of help; and
if the lowest priority job is being throttled to the throttle limit, advancing to a next higher priority level job.

10. The system of claim 9, further comprising a rate limit actuator configured to delay performance of an IO request job.

11. The system of claim 10, wherein the rate limit actuator is configured to delay performance of the IO request job to enable a higher priority job to attain the corresponding QoS target.

12. The system of claim 10, wherein the rate limit actuator is configured to delay performance of the IO request job such that the corresponding delay factor limit of the IO request job is achieved or a job having a higher priority than the IO request job achieves the corresponding QoS target.

13. A non-transient physical computer storage medium comprising a computer program product method for processing a plurality of input/output (IO) request jobs, the physical computer storage medium comprising:
computer code for determining whether one or more IO request jobs are not meeting a quality of service (QoS) target, each IO request job of the one or more IO request jobs having a corresponding priority;
computer code for selecting a highest priority job from the one or more IO request jobs;
computer code for determining whether the highest priority job has a corresponding effective rate limit imposed thereon, if one or more IO request jobs are not meeting the QoS target;
computer code for relaxing the corresponding effective rate limit, if the highest priority job has the corresponding effective rate limit imposed thereon; and
computer code for selecting one or more lower priority jobs from the one or more IO request jobs and tightening a corresponding effective limit on the one or more lower priority jobs from the one or more IO request jobs in accordance with a delay factor limit, if the highest priority job does not have the corresponding effective rate limit imposed thereon,
wherein selecting one or more lower priority jobs includes:
beginning at a lowest priority job, determining whether the lowest priority job is being throttled to a throttle limit;

if the lowest priority job is not being throttled to the throttle limit, imposing the throttle limit on the lowest priority job to provide an amount of help, wherein an amount by which the corresponding effective rate limit is relaxed is based in part on the amount of help; and if the lowest priority job is being throttled to the throttle limit, advancing to a next higher priority level job.

14. The physical computer storage medium of claim 13, wherein the computer code for relaxing comprises computer code increasing a corresponding allowed rate defining, in part, the corresponding effective rate limit.

15. The physical computer storage medium of claim 14, wherein the one or more IO request jobs includes a plurality of highest priority jobs and:
   the computer code for selecting the highest priority job comprises selecting all of highest priority jobs from the one or more IO request jobs; and
   the physical computer storage medium further comprises computer code for performing the step of relaxing after the step of selecting, if at least one of the highest priority jobs of the one or more IO request jobs has a corresponding effective rate limit imposed thereon.

16. The physical computer storage medium of claim 13, wherein the computer code for selecting the highest priority job comprises computer code tightening the corresponding effective limit on a lowest priority job of the one or more lower priority jobs.

17. The physical computer storage medium of claim 13, wherein the computer code for selecting the highest priority job comprises computer code imposing corresponding rate limits on the one or more lower priority jobs.

18. The physical computer storage medium of claim 13, wherein the computer code for selecting the highest priority job comprises computer code decreasing corresponding rate limit values assigned to the one or more lower priority jobs.

19. The physical computer storage medium of claim 13, wherein the delay factor limit comprises a maximum permitted degradation of performance for an IO request job caused, in part, by imposition of the corresponding rate limits of the one or more IO request jobs.

20. The physical computer storage medium of claim 13, further comprising computer code for relaxing the corresponding effective limit of the highest priority job, if the highest priority job has the corresponding effective rate limit imposed thereon and if all of the IO request jobs are meeting the QoS target.

* * * * *